Aug. 17, 1943.                    C. A. LOVELL                    2,327,276
                          ALTERNATING CURRENT GENERATOR
                          Filed May 14, 1941          2 Sheets-Sheet 1

INVENTOR
C. A. LOVELL
BY
John Attall
ATTORNEY

Aug. 17, 1943.  C. A. LOVELL  2,327,276
ALTERNATING CURRENT GENERATOR
Filed May 14, 1941  2 Sheets-Sheet 2

INVENTOR
C. A. LOVELL
BY
ATTORNEY

Patented Aug. 17, 1943

2,327,276

UNITED STATES PATENT OFFICE 2,327,276

ALTERNATING CURRENT GENERATOR

Clarence A. Lovell, Maplewood, N. J., assignor to Bell Telephone Laboratories, Incorporated, New York, N. Y., a corporation of New York Application May 14, 1941, Serial No. 393,405

2 Claims. (Cl. 179—90)

This invention relates to signaling means and particularly to alternating current generators of the type used in telephones for generating alternating current dialing signals representing telephone station designations.

The object of the invention is to provide an efficient reed generator of small dimensions. In this general class of minute alternating current generators of simple construction it is essential that the dimensions, the quality of materials used and the method of operation be most carefully selected and controlled and that advantage be taken of every means to promote efficiency. This object is attained in one respect by the present invention by which hysteresis and eddy-current losses are reduced through the use of a magnetic circuit including interspersed laminations of soft iron and hard steel, the soft iron having negligible retentivity and the hard steel having a high degree of retentivity.

The generator belongs in the class of reed generators in which a reed designed to have a particular natural period of vibration corresponding to the frequency of the alternating current needed for signal purposes is included in a magnetic circuit interlinked with a pick-up coil whereby when the reed is set into vibration by being plucked will through such vibration alter the conditions in such magnetic circuit and cause an alternating current to be induced in said pick-up coil.

In such generators it is usual to employ a plurality of such reeds each of a different dimension whereby a plurality of alternating currents of different frequencies may be generated and which may be transmitted either singly or in combination and in permutation codes representing different telephone designations. Energy is supplied by a permanent magnet in the said magnetic circuit and when the polarizing flux supplied by this permanent magnet is modulated by the vibration of the reed the pick-up coil interlinked with the magnetic circuit has induced in it a given frequency alternating current. Where the permanent magnet is made of one piece, as for instance in the form of a solid horseshoe magnet, the losses due to hysteresis and eddy currents are large. The eddy-current loss may be cut by laminating the magnet in well-known manner but the hysteresis loss depending on the degree of retentivity or the coefficient of hysteresis cannot be materially changed until a different quality of magnetic material is employed. Where the energy stored in a bent reed is all the energy available for causing the generator to function all methods of promoting efficiency which may be ignored because of their small resultants in other situations must be here considered. Therefore a feature of the present invention is the use of laminations of different magnetic properties, including material of both high and low retentivity.

Generators of this kind are of the balanced type, that is the reed at rest carries no flux. There is thus a simple magnetic circuit for the steady flux provided by the permanent magnet including a short air-gap. When the reed is in vibration, however, there is a multiple path for the changing flux, each branch including the reed and a part of the permanent magnet. The generator of the present invention therefore is in the form of a compound structure providing a simple and single permanent magnetic circuit and a compound high permeability magnetic circuit for changing flux in effect in shunt of said permanent magnetic circuit. Thus by providing a path of low permeability for the changing flux, a path containing an extremely low coefficient of hysteresis, the losses are avoided and the efficiency is increased.

A feature of the invention is therefore an alternating current generator comprising magnetic and electrical circuits, said magnetic circuits comprising a simple circuit containing magnetic material of high retentivity and a multiple circuit containing magnetic material of low retentivity and a movable element, said electrical circuit being interlinked only with the said multiple magnetic circuit.

Another feature is an alternating current generator having a plurality of magnetic circuits mechanically combined into a single structure but physically defined by differences in magnetic materials.

Other features will appear in the following description.

The drawings consist of two sheets having six figures as follows.

The alternating current generator of the present invention consists essentially of a balanced magnetic circuit including two parts 1 and 2 of magnetic material, a plurality of reeds 5, 6, 7, 8 and 9 extending through an air-gap formed by the ends of the magnetic members 1 and 2 and a coil 10 interlinked with the magnetic circuit by being effectively wound about the reeds. The parts 1 and 2 are shown as laminated and it is intended that such laminations be alternately of different magnetic materials, some being of material having a high coefficient of retentivity and some having a low coefficient of retentivity. Expressed differently, the laminations are partly of material appropriate for permanent magnets and partly of soft iron or other equivalent low reluctance material. When one of the reeds is plucked and thus set in vibration an alternating current of the same frequency as the natural period of vibration of the reed is induced in the coil 10 and may be used for signaling purposes. Each reed is tuned to a different frequency.

Figure 5:
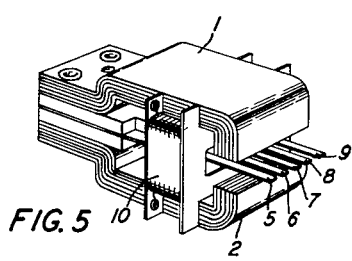
Fig. 5 is a perspective view of one form of the alternating current generator of the present invention, and, Fig. 6 is a similar view of another form thereof.
Figure 6:
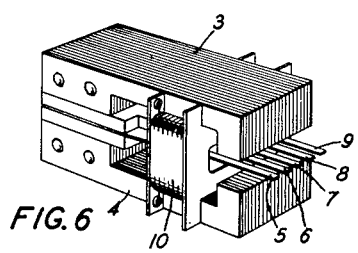

This generator is of the balanced type since with the reeds at rest none of the flux of the permanent magnetic laminations threads the reeds. When a reed is in vibration only the alternating flux set up by such vibration flows through the reed. Effectively the magnetic circuit is compound, consisting of a simple circuit including the permanent magnetic laminations and a double circuit having one branch through the reeds and the soft iron laminations of the element 2. The flux of the permanent magnetic laminations is confined mostly to the first simple circuit and the alternating flux during the vibration of the reeds is confined mostly to the second double circuit. The soft iron laminations being of much lower reluctance than the permanent magnetic laminations, the alternating flux will flow mostly through them and thus the hysteresis and eddy-current losses will be greatly reduced by the present construction. In Fig. 6 the parts 3 and 4 corresponding to the parts 1 and 2 of Fig. 5 are constructed of laminations of the same materials but in this case the laminations are in somewhat different form. The arrangement of Fig. 5 lends itself to a bent type of pole-piece which has some constructional advantages while the arrangement of Fig. 6 has other constructional advantages. Both equally well carry out the spirit of the present invention since both provide in a compact structure effective parallel magnetic circuits each best suited to its own use.

The manner in which the reeds of this generator are plucked may be seen from Figs. 1 to 4. Here the generator of the present invention is shown as it would be incorporated in a telephone handset cradle. A group of ten digit push buttons 21 to 30 is provided for the use of the subscriber for calling purposes. Each button operates a lever such as 17 on which the button 26 is mounted. These levers are all pivoted on the shaft 19 and each has an arm such as 18 for rotating a commonly actuated V-shaped bar 31. Each lever is held in its normal position by an individual spring such as 20 as well as by the pressure of the common bar 31 which has a similar spring.

There are five U-shaped code bars 12 to 16 inclusive also pivoted on the shaft 19. The lever 17 is provided with two lugs 32 and 33 which bear on the bars 12 and 14 respectively so that when the key 2? is depressed the two bars 12 and 14 will be moved. Each lever has two such lugs but each will operate a different combination of the bars 12 to 16 so that these bars are operated in a permutation code by the push buttons 21 to 30.

Figure 1:
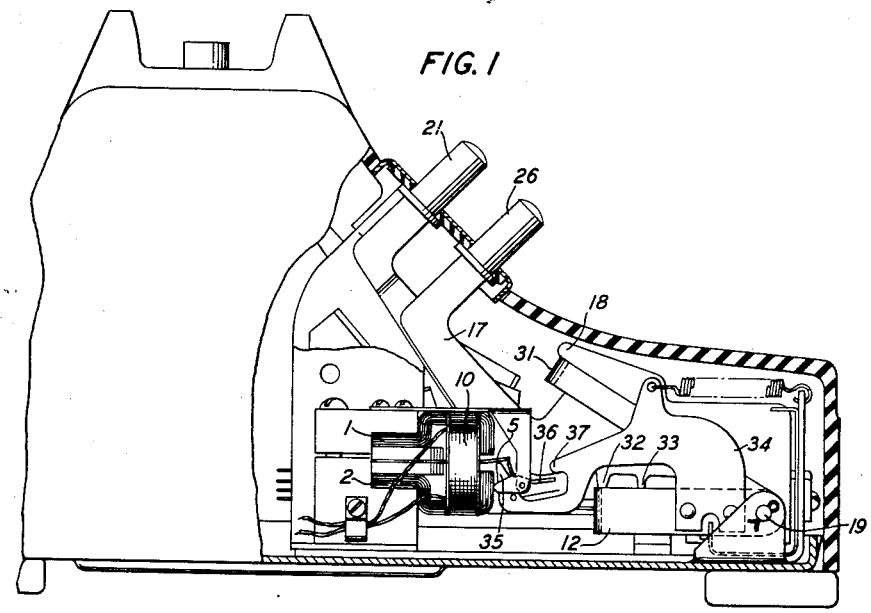
Fig. 1 is a side elevation partly in section showing the key mechanism and the manner in which the generator of the present invention is operated.
Figure 2:
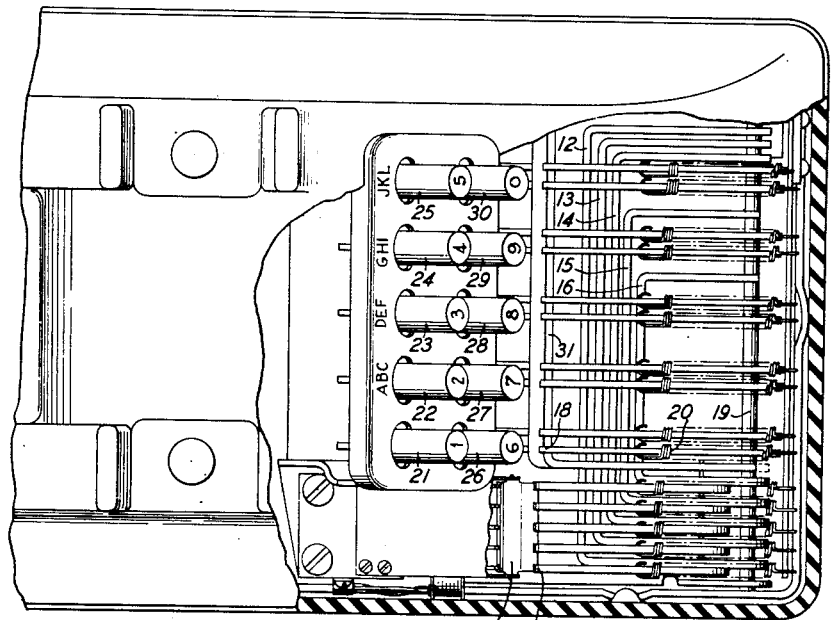
Fig. 2 is a top view partly in section of the same and showing in more detail the operative combinations of code bars and key members.
Figure 3:
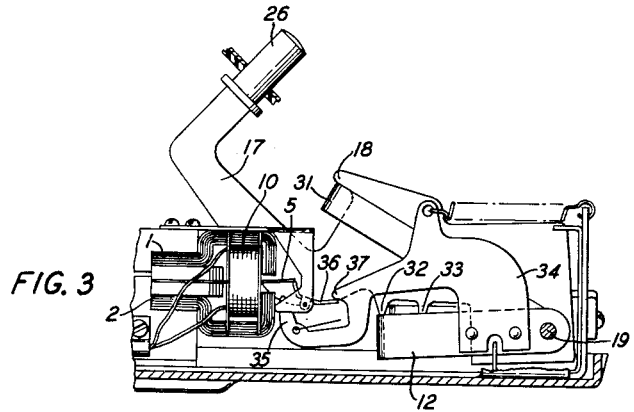
Fig. 3 is a fragmentary view showing one of the keys partly operated.
Figure 4:
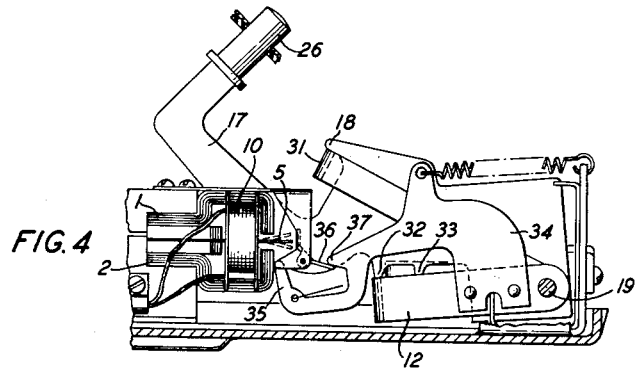
Fig. 4 is a view similar to Fig. 3 showing one of the keys and a pawl member in the operated position, a reed being portrayed as freely vibrating.

To each of the code bars there is secured a lever such as the lever 34 shown as riveted to the bar 12. The lever 34 terminates in a finger 35 which normally rests against the reed 5 and stresses it upwardly as shown in Fig. 1. When the lever 34 is rotated in a counter-clockwise direction the finger 35 moves downwardly and allows the reed to come in contact with the upper edge of the pawl member 36. As the lever 34 continues its movement another finger 37 engages the pawl member 36 as shown in Fig. 3 and rotates it in a clockwise direction as shown. Thus the reed is set in vibration.

When the button 26 is released the pawl member 36 rotates in a counter-clockwise direction under spring control and after the finger 35 has lifted the reed to nearly its extreme position the pawl member 36 slips in under the end of the reed.

It is intended that this specification will cover other modifications of this device which come within the spirit of this invention and the scope of the following claims.

What is claimed is:

1. An alternating current generator comprising a simple magnetic circuit containing magnetic material of high retentivity, a multiple magnetic circuit containing magnetic material of low retentivity, a plurality of vibratable reeds each having a different natural period of vibration, said reeds being included in said multiple magnetic circuit and an electrical circuit comprising a coil wound about said reeds.

2. An alternating current generator comprising a simple magnetic circuit formed of laminations of permanent magnetic material, a multiple magnetic circuit formed of like shaped laminations of soft iron, said laminations being assembled into a unitary structure, a plurality of vibratable reeds each having a different natural period of vibration, said reeds being included in and forming part of said multiple magnetic circuit and an electrical circuit comprising a coil wound about said reeds.

CLARENCE A. LOVELL.